(12) United States Patent
Choi

(10) Patent No.: US 6,917,491 B2
(45) Date of Patent: Jul. 12, 2005

(54) HARD DISK DRIVE HAVING DISK PROTECTOR AND MAGNETIC HEAD PROTECTOR

(75) Inventor: Byoung-gyou Choi, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 44 days.

(21) Appl. No.: 10/425,642

(22) Filed: Apr. 30, 2003

(65) Prior Publication Data

US 2003/0206368 A1 Nov. 6, 2003

(30) Foreign Application Priority Data

May 3, 2002 (KR) .................................... 2002-0024440
Jul. 13, 2002 (KR) .................................... 2002-0040992

(51) Int. Cl.[7] .............................................. G11B 17/00
(52) U.S. Cl. .................................................. 360/97.01
(58) Field of Search ...................... 360/97.01–97.03, 360/254.7–254.8, 260, 264.1, 265.1

(56) References Cited

U.S. PATENT DOCUMENTS

| | | | |
|---|---|---|---|
| 4,068,851 A | * | 1/1978 | Yamamura .................... 369/79 |
| 4,329,722 A | * | 5/1982 | West ....................... 360/97.03 |
| 4,471,395 A | * | 9/1984 | Beck et al. .............. 360/98.04 |
| 4,680,656 A | * | 7/1987 | Manzke et al. .......... 360/97.03 |
| 5,189,574 A | * | 2/1993 | Imamura et al. ......... 360/234.2 |
| 5,239,431 A | | 8/1993 | Day et al. |
| 5,640,290 A | | 6/1997 | Khanna et al. ............. 360/105 |
| 5,757,587 A | | 5/1998 | Berg et al. |
| 6,067,209 A | | 5/2000 | Aoyagi et al. |
| 6,212,029 B1 | | 4/2001 | Fioravanti |
| 6,292,333 B1 | | 9/2001 | Blumentritt et al. |
| 6,714,379 B1 | * | 3/2004 | Thompson et al. ...... 360/97.02 |
| 6,771,458 B2 | * | 8/2004 | Kim et al. ............... 360/97.02 |
| 6,781,791 B1 | * | 8/2004 | Griffin et al. ................ 360/128 |

FOREIGN PATENT DOCUMENTS

| | | |
|---|---|---|
| CN | 1253359 | 10/1999 |
| JP | 61-104380 | 5/1986 |
| JP | 9-45064 | 2/1997 |
| JP | 09-281866 | 10/1997 |
| JP | 10-106248 | 4/1998 |
| JP | 2001-35131 | 2/2001 |

* cited by examiner

*Primary Examiner*—Angel Castro
(74) *Attorney, Agent, or Firm*—Staas & Halsey LLP

(57) ABSTRACT

A hard disk drive includes a housing having a base plate and a cover plate, and a spindle motor installed on the base plate. At least one magnetic disk to store data is installed at the spindle motor and rotated by the spindle motor. An actuator is pivotably installed on the base plate and has a magnetic head to record data on the magnetic disk and to reproduce the data from the magnetic disk. At least one disk protector protrudes to a predetermined height toward the magnetic disk at a position corresponding to an edge portion of the magnetic disk where data is not recorded. A magnetic head protector protrudes to a predetermined height toward a suspension in a parking zone where the magnetic head is parked. The disk protector and the magnetic head protector are provided on an upper surface of the base plate and/or a lower surface of the cover plate. Thus, when an external impact is applied to the hard disk drive, the magnetic disk and the magnetic head are prevented from being damaged.

15 Claims, 5 Drawing Sheets

HARD DISK DRIVE HAVING DISK PROTECTOR AND MAGNETIC HEAD PROTECTOR

CROSS-REFERENCE TO RELATED APPLICATIONS

This application claims the benefit of Korean Application No. 2002-24440, filed May 3, 2002 and Korean Application No. 2002-40992, filed Jul. 13, 2002, in the Korean Intellectual Property Office, the disclosures of which are incorporated herein by reference.

BACKGROUND OF THE INVENTION

1. Field of the Invention

The present invention relates to a hard disk drive and more particularly, to a hard disk drive having a disk protector and a magnetic head protector to protect a disk from an external impact.

2. Description of the Related Art

A hard disk drive (HDD), one of the types of auxiliary memory devices of a computer, reads data stored in a magnetic disk or records data on the magnetic disk by using a magnetic head.

FIG. 1 is a perspective view showing a conventional hard disk drive. FIG. 2 is a vertical sectional view of the hard disk drive shown in FIG. 1.

Referring to FIG. 1, a conventional hard disk drive includes a housing 10, a spindle motor 30 installed in the housing 10 rotating a magnetic disk (hard disk) 20, and an actuator 40 having a magnetic head (not shown) recording data on the disk 20 and reproducing the data recorded on the disk 20.

The housing 10 is installed in a main body (not shown) of a computer (not shown) and includes a base plate 11 supporting both the spindle motor 30 and the actuator 40 and a cover plate 12 coupled to an upper portion of the base plate 11 to enclose and protect the disk 20. Typically, the housing 10 is formed of stainless steel or aluminum.

The disk 20 is a recording medium on which data is recorded. One or a plurality of disks can be spaced a predetermined distance from one another. The disk 20 is rotated by the spindle motor 30 and includes a parking zone 21 provided at an inner circumferential side of the disk 20 where a slider 42 having the magnetic head mounted thereon is disposed when power is turned off and a data zone 22 provided at an outer circumferential side of the parking zone 21 where magnetic signals are recorded. Reference numeral 23 denotes a zone outside the data zone 22 where data is not actually recorded.

The coupling structure of the housing 10, the spindle motor 30, and the magnetic disk 20 will be described in detail with reference to FIGS. 2 and 3. The spindle motor 30 is supported by a flange 31, which is fixedly installed on the base plate 11. An upper end portion of a shaft of the spindle motor 30 is fixedly coupled to the cover plate 12 by a screw 36. A bearing 32a is provided around an outer circumference of the shaft 32 so that a hub 33 is rotatable. The disk 20 is inserted around an outer circumference of the hub 33. When a plurality of disks 20 are installed, a ring shaped spacer 34 is installed around the outer circumference of the hub 33 to maintain a gap between the disks 20. A clamp 35 is coupled to an upper end portion of the hub 33 to prevent the disk 20 from escaping.

Referring back to FIG. 1, the actuator 40 is pivotable around a pivot shaft 47 installed on the base plate 11 by a voice coil motor 48. The actuator 40 includes an arm 46 coupled to the pivot shaft 47 to be capable of pivoting and a suspension 44 coupled to the arm 46 and supporting the slider 42 having the magnetic head mounted thereon to be elastically biased toward a surface of the disk 20.

In the conventional hard disk drive having the above structure, the slider 42 is disposed in the parking zone 21 of the disk 20 by an elastic force of a suspension 44 when the power is turned off. When the power is turned on, the disk 20 begins to rotate and a lifting force is generated by air pressure so that the slider 42 is lifted. The slider 42 in a lifted state is moved to the data zone 22 of the disk 20 as the arm 46 of the actuator 40 rotates. The slider 42, which is moved to the data zone 22 of the disk 20, maintains the lifted state at a height where the lifting force by the rotation of the disk 20 and the elastic force by the suspension 44 are balanced. The magnetic head mounted on the slider 42 records and reproduces data with respect to the disk 20 while maintaining a predetermined distance from the rotating disk 20.

However, when an impact is applied from an outside to the conventional hard disk drive, the disk 20 installed in the housing 10 can either be shaken or warped. If Thus, since the outer circumferential side 23 of the disk 20 where no data is recorded contacts the base plate 11 or the cover plate 12, the data zone 22 of the disk 20 does not directly contact the base plate 11 or the cover plate 12. However, if a protruding eject pin, a bur, or a foreign material P exists on an upper surface of the base plate 11 or a lower surface of the cover plate 12, corresponding to the data zone 22 of the disk 20, when the disk 20 collides with the base plate 11 or the cover plate 12, the foreign material P may contact the data zone 22 of the disk 20 so that the data zone 22 of the disk 20 may be damaged.

Further, when the suspension 44 in an elastically biased state is bent by an external impact in a direction opposite to a direction in which the elastic force is applied, as shown in FIG. 3, and bent back by an elastic restoring force to contact the surface of the disk 20, the magnetic head can be damaged by an impact between the magnetic head mounted on the slider 42 and the disk 20.

SUMMARY OF THE INVENTION

To solve the above and other problems, a hard disk drive is provided having a disk protector and a magnetic head protector provided at a base plate and a cover plate to prevent damage to a data zone of the disk and a magnetic head by an external impact.

Additional aspects and/or advantages of the invention will be set forth in part in the description which follows and, in part, will be obvious from the description, or may be learned by practice of the invention.

According to an aspect, a hard disk drive comprises a housing having a base plate and a cover plate, a spindle motor installed on the base plate, at least one disk storing data installed at the spindle motor and rotated by the spindle motor, an actuator pivotally installed on the base plate and having a magnetic head recording data on the disk and reproducing the data from the disk, at least one disk protector protruding to a predetermined height toward the disk at a position corresponding to an edge portion of the disk where the data is not recorded, and a magnetic head protector protruding to a predetermined height toward a suspension in a parking zone where the magnetic head is parked, wherein the at least one disk protector and the magnetic head protector are provided on an upper surface of the base plate and/or a lower surface of the cover plate.

A protruding surface, protruding to a predetermined height toward the disk, is formed on each of the upper surface of the base plate and the lower surface of the cover plate to reduce a gap between the disk and each of the base plate and the cover plate, and the disk protector is formed on each protruding surface.

A plurality of the disk protectors is formed with a predetermined interval in a circumferential direction of the disk. Three disk protectors are formed on each of the base plate and the cover plate.

The disk protector is formed to have a C shape in which a portion interfering with the actuator is open to face an edge portion of the disk.

A buffer member is provided on a surface of the disk protector facing the disk. The buffer member is formed of a viscoelastic material having a surface rigidity lower than that of the disk.

A buffer member is provided on a surface of the magnetic head protector facing the suspension.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
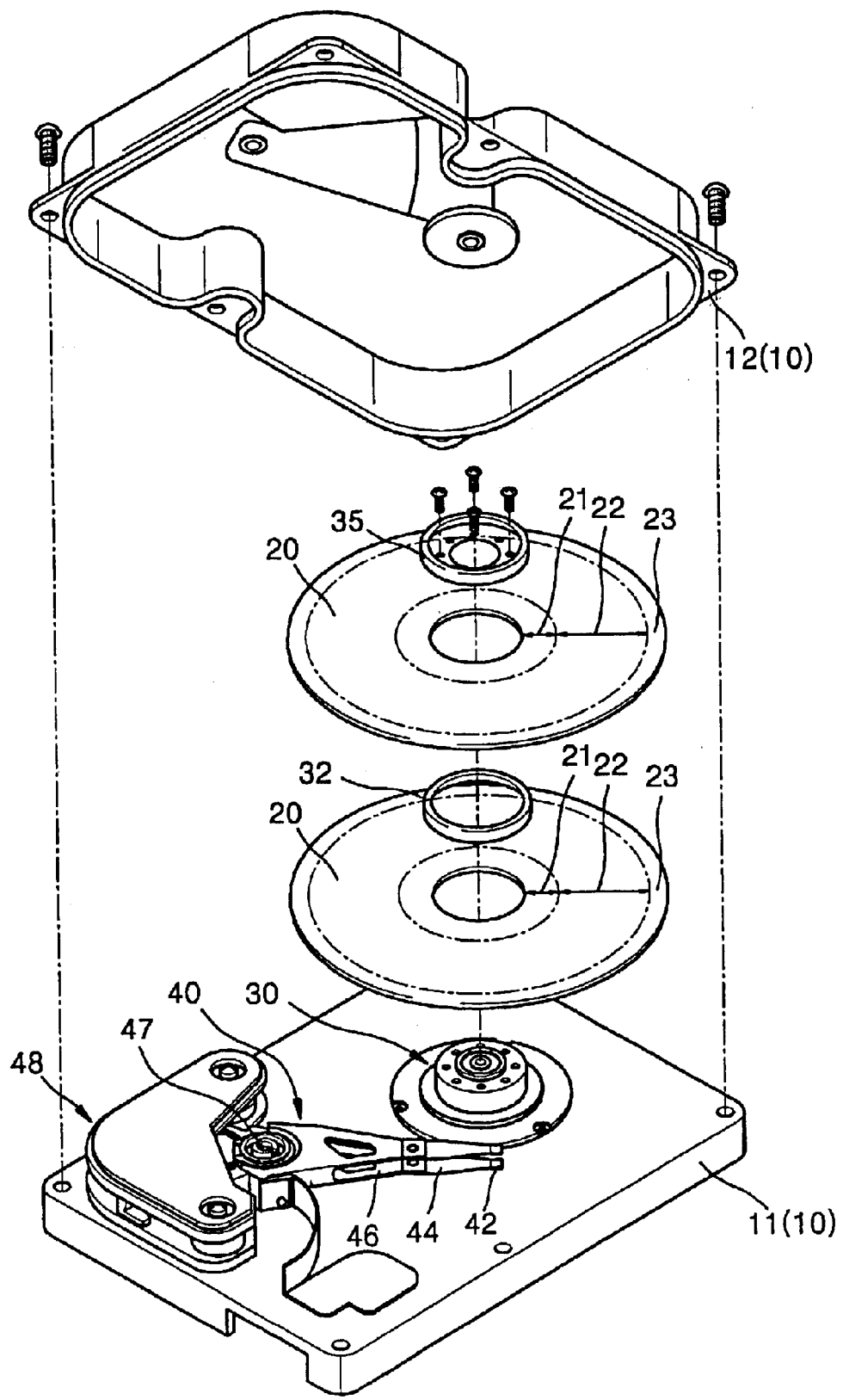
FIG. 1 is an exploded perspective view of a conventional hard disk drive.
Figure 2:
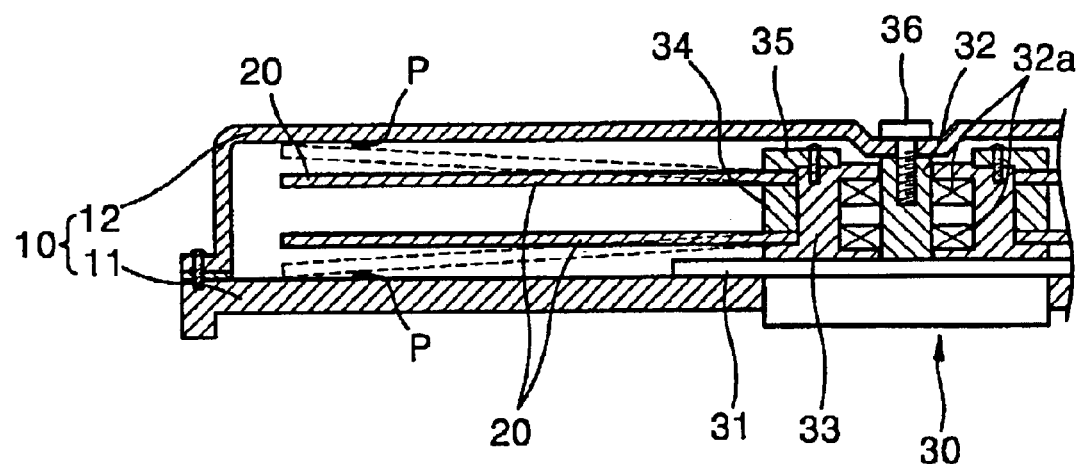
FIG. 2 is a vertical sectional view of the hard disk drive of FIG. 1, showing a state in which a magnetic disk is damaged by an external impact.
Figure 3:
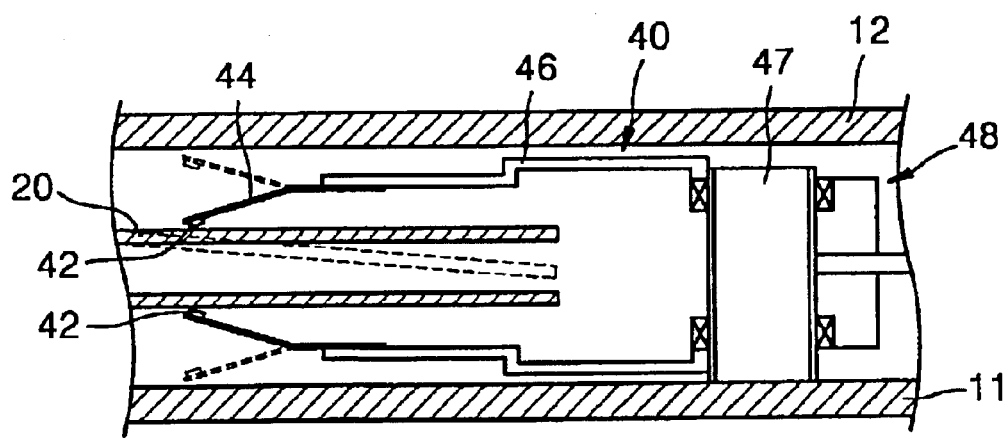
FIG. 3 is a vertical sectional view of the hard disk drive of FIG. 1, showing a state in which a suspension is bent by an external impact.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
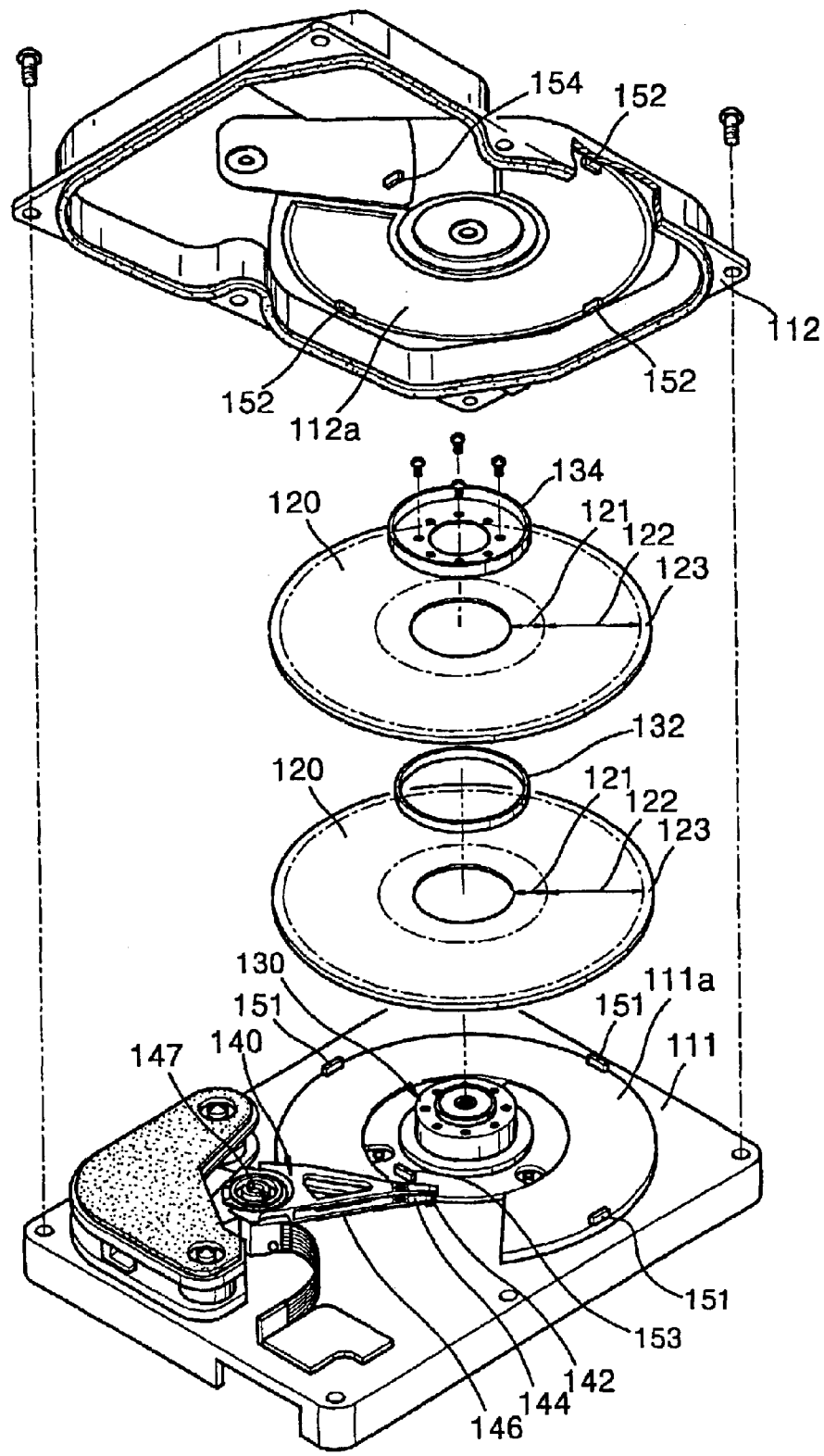
FIG. 4 is an exploded perspective view of a hard disk drive having a magnetic disk and a magnetic head protector according to a first embodiment of the present invention.
Figure 5:
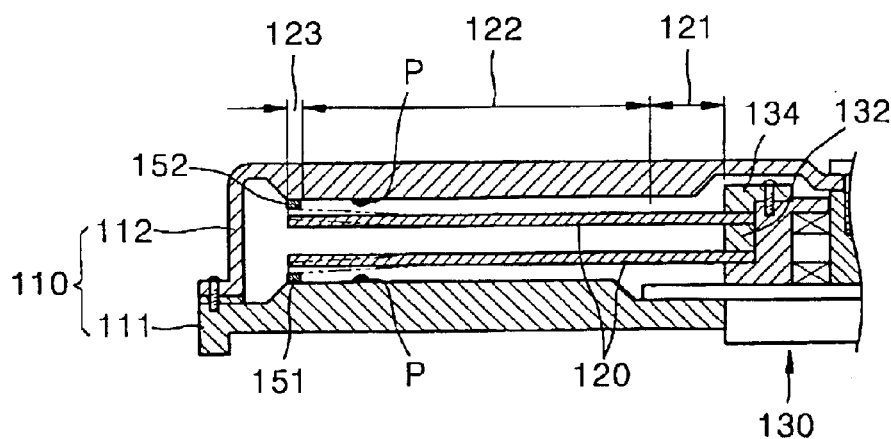
FIG. 5 is a vertical sectional view showing a portion where a disk protector shown in FIG. 4 is provided when the magnetic disk is deformed by an external impact.
Figure 6:
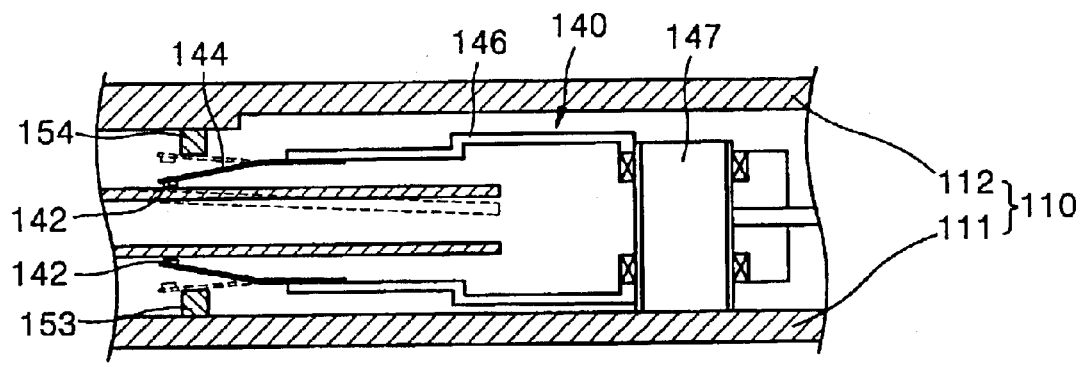
FIG. 6 is a vertical sectional view showing a portion where the magnetic head protector shown in FIG. 4 is provided when a suspension is deformed by an external impact.

Referring to FIGS. 4 through 6, a hard disk drive having a disk protector and a magnetic head protector according to a first embodiment of the present invention includes a housing 110 having a predetermined inner space. In the housing 110, there is provided a spindle motor 130, a magnetic disc 120, an actuator 140, disk protectors 151 and 152, and magnetic head protectors 153 and 154.

The housing 110 is installed in a main body (not shown) of a computer (not shown) and includes a base plate 111 supporting the spindle motor 130 and the actuator 140 and a cover plate 112 coupled to an upper portion of the base plate 111 enclosing and protecting the magnetic disk 120. The housing 110 is typically manufactured of stainless steel or aluminum. Protruding surfaces 111a and 112a protruding a predetermined height toward the magnetic disk 120 are formed on an upper surface of the base plate 111 and a lower surface of the cover plate 112, respectively. The protruding surfaces 111a and 112a reduce a disk fluttering by reducing a gap between the magnetic disk 120 and the respective base and cover plates 111 and 112. A portion of the protruding surfaces 111a and 112a, which interferes with a rotation of an arm 146 of the actuator 140, is removed and each of the protruding surfaces 111a and 112a forms a "C" shape.

One or a plurality of magnetic disks 120 is installed inside the housing 110 as a recording medium to record data. A parking zone 121 where a slider 142 having a magnetic head (not shown) mounted thereon is disposed when power is turned off is provided at an inner circumferential side of the magnetic disk 120. A data zone 122 where a magnetic signal is recorded is provided outside the parking zone 121. However, data is not recorded in a portion outside the data zone 122, that is, an edge portion 123 of the magnetic disk 120.

The spindle motor 130 rotating the magnetic disk 120 is fixedly installed on the base plate 111. When a plurality of magnetic disks 120 are installed on the spindle motor 130, a ring shaped spacer 132 maintaining a gap between the magnetic disks 120 is inserted between the magnetic disks 120. A clamp 134 preventing the magnetic disks 120 from escaping is coupled to an upper end portion of the spindle motor 130.

The actuator 140 to record data on the magnetic disk 120 or to read the data recorded therefrom is installed on the base plate 111 and is pivotable. The actuator 140 includes the arm 146 pivotably coupled to a pivot shaft 147 and a suspension 144 coupled to the arm 146 to support the slider 142 having the magnetic head elastically biased toward a surface of the magnetic disk 120.

In the hard disk drive, disk protectors 151 and 152 are provided as disk protecting units to prevent a foreign material P from contacting the data zone 122 of the magnetic disk 120 when the magnetic disk 120 is shaken or deformed by an external impact.

The disk protectors 151 and 152 protrude to a predetermined height toward the magnetic disk 120 at positions corresponding to the edge portion 123 of the magnetic disk 120 from the protruding surfaces 111a and 112a of the base plate 111 and the cover plate 112, respectively. Three disk protectors 151 and 152 are respectively provided on each of the protruding surfaces 111a and 112a at intervals of about 90° along the circumference of the magnetic disk 120, as shown in FIG. 4. The disk protector 151 formed on the protruding surface 111a of the base plate 111 and the disk protector 152 formed on the protruding surface 112a of the cover plate 112 are arranged at positions corresponding to each other. Further, unlike the above description, one of each of the disk protectors 151 and 152 may be respectively provided on the protruding surfaces 111a and 112a and positioned opposite to the actuator 140, or two, four or more of each of the disk protectors 151 and 152 may be respectively provided at predetermined intervals in a circumferential direction of the magnetic disk 120.

Further, in the hard disk drive the magnetic head protectors 153 and 154 are provided as a magnetic head protecting unit to prevent damage to the magnetic head mounted on the slider 142, when the suspension 144 is shaken or deformed and contacts the surface of the magnetic disk 120 by an external impact.

The magnetic head protectors 153 and 154, respectively, protrude to a predetermined height toward the suspension 144 at positions on the inner surfaces of the base plate 111 and the cover plate 112 corresponding to a position of the suspension 144 in the parking zone 121 of the magnetic disk 120. The magnetic head protector 153 formed on the base plate 111 and the magnetic head protector 154 formed on the cover plate 112 are arranged at positions corresponding to each other.

As the magnetic head protectors 153 and 154 are formed to protrude from inner surfaces of the base plate 111 and the cover plate 112, respectively, a displacement of the suspension 144 by the external impact is restricted. Thus, as shown in FIG. 6, even when the suspension 144 is deformed by the external impact, since the displacement thereof is reduced by the magnetic head protectors 153 and 154, an amount of impact applied to the magnetic disk 120 by the magnetic head mounted on the slider 142 through a restoring force from the suspension 144 is reduced so that the magnetic head is protected.

The disk protectors 151 and 152 and the magnetic head protectors 153 and 154 may be integrally formed with the base plate 111 and the cover plate 112, respectively. By integrally forming the disk protectors 151 and 12 and the magnetic head protectors 153 and 154, a manufacturing process is simplified and manufacturing costs are reduced by simultaneously forming the disk protectors 151 and 152 and the magnetic head protectors 153 and 154 when the base plate 111 and the cover plate 112 are manufactured. However, the disk protectors 151 and 152 and the magnetic head protectors 153 and 154 may be fixedly installed onto the protruding surfaces 111a and 112a of the base plate 111 and the cover plate 112 after the disk protectors 151 and 152 and the magnetic head protectors 153 and 154 are manufactured as supplementary members.

Figure 7:
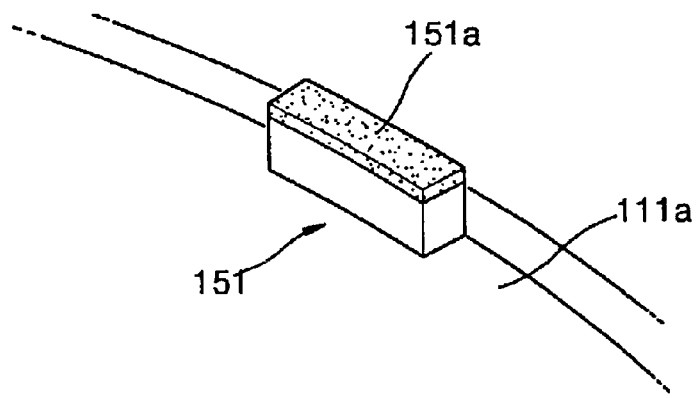
FIG. 7 is an enlarged perspective view of the disk protector shown in FIG. 4.

FIG. 7 is an enlarged perspective view of the disk protector 151 shown in FIG. 4. Although FIG. 7 shows only the disk protector 151 formed on the protruding surface 111a of the base plate 111, the disk protector 152 formed on the cover plate 112 and the magnetic head protectors 153 and 154 are not shown since they have an identical shape.

As shown in FIG. 7, a buffer member 151 a may be provided at a surface of the disk protector 151 to be positioned towards the magnetic disk 120 so that the magnetic disk 120 contacts the buffer member 151 a when the magnetic disk 120 is shaken or warped. The buffer member 151a has elasticity and a rigidity of the buffer member 151a that is lower than that of the surface of the magnetic disk 120 and is formable of a viscoelastic material such as natural rubber or synthetic rubber. The buffer member 151a prevents damage on the surface of the magnetic disk 120 by absorbing an external impact when the magnetic disk 120 collides against the disk protector 151 from the external impact, and a generation of particles caused by the damage on the surface of the magnetic disk 120. If the particles are generated from the damage to the surface of the magnetic disk 120, not only is the data zone 122 of the magnetic disk 120 damaged, but a performance of the magnetic head for data to record and to reproduce data is lowered. Thus, to prevent the generation of the particles if possible is preferable.

Figure 8:
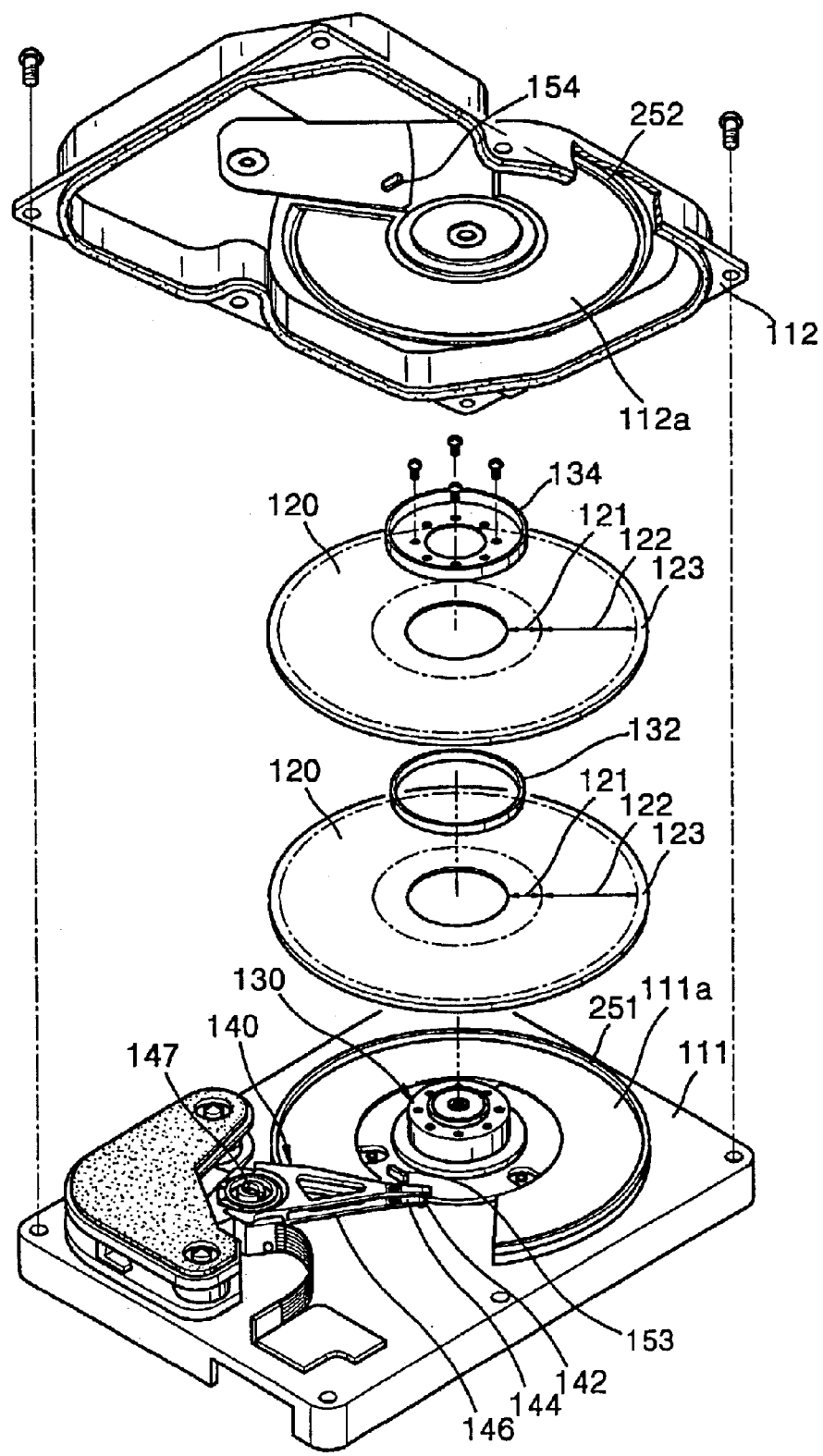
FIG. 8 is an exploded perspective view of a second hard disk drive having a disk protector and a magnetic head protector according to a second embodiment of the present invention.

FIG. 8 is an exploded perspective view of a second hard disk drive having a disk protector and a magnetic head protector according to a second embodiment of the present invention. Here, the same reference numerals as those in FIG. 4 indicate the same elements.

Referring to FIG. 8, disk protectors 251 and 252 are formed to face an entire edge portion 123 of the magnetic disk 120, except for a range in which the actuator 140 operates. That is, the disk protectors 251 and 252 are formed to have a "C" shape having an open portion interfering with the arm 146 of the actuator 140. The installation operation and operation of the disk protectors 251 and 252 in this embodiment are the same as those in the above-described previous embodiment. Also, in this embodiment, a buffer member may be provided on a surface of each of the magnetic disk protectors 251 and 252 facing the disk 120, as shown in FIG. 7.

As described above, when an external impact is applied to a hard disk drive so that the magnetic disk is shaken or warped, since a data zone of the magnetic disk is prevented from contacting a base plate or a cover plate by the disk protectors, the data zone of the magnetic disk is prevented from being damaged. Further, since an amount of displacement of a suspension is restricted by a magnetic head protector, an amount of impact between a magnetic head and the magnetic disk is reduced so that the magnetic head is prevented from being damaged.

Although a few preferred embodiments of the present invention have been shown and described, it would be appreciated by those skilled in the art that changes may be made in this embodiment without departing from the principles and spirit of the invention, the scope of which is defined in the claims and their equivalents. For example, although the disk protectors in the embodiments are provided on the protruding surfaces of the base plate and the cover plates, the disk protectors can be applied to a base plate and a cover plate where the protruding surfaces are not formed as shown in FIG. 1.

What is claimed is:

1. A hard disk drive comprising:

a housing having a base plate and a cover plate;

a spindle motor installed on the base plate;

at least one disk to store data installed at the spindle motor and rotated by the spindle motor;

an actuator pivotably installed on the base plate and having a magnetic head to record data on the at least one disk and to reproduce the data from the at least one disk;

one or more disk protectors protruding to a predetemined height toward a corresponding disk at a position corresponding to an edge portion thereof where data is not recorded;

a magnetic head protector protruding to a predetermined height toward a suspension in a parking zone where the magnetic head is parked; and a protruding surface protruding to a predetermined height toward the corresponding disk formed on each of the upper surface of the base plate and the lower surface of the cover plate to reduce a gap between the corresponding disk and each of the base plate and the cover plate, wherein the one or more disk protectors are formed on each of the protruding surfaces, and wherein the one or more disk protectors and the magnetic head protector are provided on the upper surface of the base plate and/or the lower surface of the cover plate.

2. The hard disk drive as claimed in claim 1, wherein a plurality of the disk protectors is formed with a predetermined interval therebetween in a circumferential direction of the corresponding disk.

3. The hard disk drive as claimed in claim 2, wherein three disk protectors are formed on each of the base plate and the cover plate.

4. The hard disk drive as claimed in claim 1, wherein a plurality of the disk protectors is formed with a predetermined interval therebetween in a circumferential direction of the corresponding disk.

5. The hard disk drive as claimed in claim 4, wherein three disk protectors are formed on the protruding surfaces corresponding to each of the base plate and the cover plate.

6. The hard disk drive as claimed in claim 1, wherein the disk protectors are formed to have a C shape in which a portion interfering with the actuator is open to face an edge portion of the disk.

7. The hard disk drive as claimed in claim 1, wherein the disk protectors are formed to have a C shape in which a portion interfering with the actuator is open to face an edge portion of the disk.

8. The hard disk drive as claimed in claim 1, wherein the one or more disk protectors each comprises: a buffer member provided on a surface thereof to face the corresponding disk.

9. The hard disk drive as claimed in claim 8, wherein the buffer member is formed of a viscoelastic material having a surface rigidity lower than that of the corresponding disk.

10. The hard disk drive as claimed in claim 1, wherein the one or more disk protectors each comprise:

a buffer member provided on a surface thereof to face the corresponding disk.

11. The hard disk drive as claimed in claim 10, wherein the buffer member is formed of a viscoelastic material having a surface rigidity lower than that of the corresponding disk.

12. The hard disk drive as claimed in claim 1, wherein the magnetic head protector comprises:

a buffer member provided on a surface of the magnetic head protector to face the suspension.

13. The hard disk drive as claimed in claim 12, wherein the buffer member is formed of a viscoelastic material having a surface rigidity lower than that of the corresponding disk.

14. The hard disk drive as claimed in claim 1, wherein the magnetic head protector comprises:

a buffer member provided on a surface of the magnetic head protector to face the suspension.

15. The hard disk drive as claimed in claim 14, wherein the buffer member is formed of a viscoelastic material having a surface rigidity lower than that of the corresponding disk.

* * * * *

UNITED STATES PATENT AND TRADEMARK OFFICE
CERTIFICATE OF CORRECTION

PATENT NO. : 6,917,491 B2
DATED : July 12, 2005
INVENTOR(S) : Byoung-gyou Choi

It is certified that error appears in the above-identified patent and that said Letters Patent is hereby corrected as shown below:

Column 6,
Line 49, change "predetemined" to -- predetermined --.

Signed and Sealed this

Fourteenth Day of March, 2006

JON W. DUDAS
*Director of the United States Patent and Trademark Office*